(12) United States Patent
Liu

(10) Patent No.: US 11,958,545 B2
(45) Date of Patent: Apr. 16, 2024

(54) POWER STEERING METHOD AND DEVICE, VEHICLE, AND COMPUTER STORAGE MEDIUM

(71) Applicant: SEGWAY TECHNOLOGY CO., LTD., Changzhou (CN)

(72) Inventor: Jiachun Liu, Changzhou (CN)

(73) Assignee: SEGWAY TECHNOLOGY CO., LTD., Changzhou (CN)

( * ) Notice: Subject to any disclaimer, the term of this patent is extended or adjusted under 35 U.S.C. 154(b) by 226 days.

(21) Appl. No.: 17/346,352

(22) Filed: Jun. 14, 2021

(65) Prior Publication Data

US 2021/0387668 A1    Dec. 16, 2021

(30) Foreign Application Priority Data

Jun. 15, 2020   (CN) .......................... 202010541824.5

(51) Int. Cl.
*B60K 35/00* (2006.01)
*B62D 5/04* (2006.01)
*B62D 6/00* (2006.01)

(52) U.S. Cl.
CPC ............ *B62D 5/0463* (2013.01); *B60K 35/00* (2013.01); *B62D 6/007* (2013.01); *B60K 2370/52* (2019.05)

(58) Field of Classification Search
None
See application file for complete search history.

(56) References Cited

U.S. PATENT DOCUMENTS

| 8,386,128 B2 | 2/2013 | Riepold et al. |
| 9,221,493 B2 | 12/2015 | Nishimori |
| 2009/0057047 A1* | 3/2009 | Beechie ................ B60K 23/08 701/69 |

FOREIGN PATENT DOCUMENTS

| CN | 105531177 A | 4/2016 |
| CN | 109367619 A | 2/2019 |
| CN | 110316247 A | 10/2019 |
| CN | 111002841 A | 4/2020 |
| GB | 2518146 A | 3/2015 |
| WO | WO 2009/096998 A1 | 8/2009 |

OTHER PUBLICATIONS

Chinese Office Action dated Jul. 23, 2020 for Application No. 202010541824.5, 19 pages.
Chinese Office Action dated Aug. 8, 2020 for Application No. 202010541824.5, 31 pages.
Extended European Search Report dated Nov. 5, 2021 for Application No. 21179342.7, 9 pages.

\* cited by examiner

*Primary Examiner* — James M McPherson
(74) *Attorney, Agent, or Firm* — Frost Brown Todd LLP

(57) ABSTRACT

Provided are a power steering method and a power steering device applied in a vehicle including a power steering assembly. The method includes detecting whether a direction changing wheel of the vehicle is a driving wheel; determining a power assisted gear position of the power steering assembly according to whether the direction changing wheel of the vehicle is the driving wheel; and controlling the power steering assembly to generate a power steering torque according to the power assisted gear position of the power steering assembly. The direction changing wheel of the vehicle is a front wheel or a rear wheel of the vehicle.

20 Claims, 5 Drawing Sheets

---

101 — detecting whether a direction changing wheel of the vehicle is a driving wheel, wherein the direction changing wheel of the vehicle is a front wheel or a rear wheel of the vehicle; determining a power assisted gear position of the power steering assembly according to whether the direction changing wheel of the vehicle is the driving wheel 102 — controlling the power steering assembly to generate a power steering torque according to the power assisted gear position of the power steering assembly

POWER STEERING METHOD AND DEVICE, VEHICLE, AND COMPUTER STORAGE MEDIUM

CROSS-REFERENCE TO RELATED APPLICATION

This application claims priority to and benefits of Chinese Patent Application Serial No. 202010541824.5, filed with the National Intellectual Property Administration of P. R. China on Jun. 15, 2020, the entire content of which is incorporated herein by reference.

FIELD

The present disclosure relates to a field of power steering technologies, and more particularly to a power steering method and a power steering device, a vehicle and a computer storage medium.

BACKGROUND

An electric power steering (EPS) system refers to a power steering system that relies on an electric motor to provide a steering torque, which is also known as an electric power assisted steering (EPAS) system. One end of the EPS of the vehicle is connected to a direction control component (such as a steering wheel and a steering handle), and the other end is connected to a steering machine which is able to drive the front wheels. The user rotates the direction control component with a small force, and the EPS controls the motor to provide a power assisted steering torque to the steering machine according to a steering torque and a steering angle of the direction control component, and a vehicle speed, thereby driving the front wheels to achieve steering.

However, in the existing steering technology, the power assisted steering torque provided by the EPS of the vehicle is unchangeable and lacks flexibility, and thus different application requirements for various scenarios cannot be met.

SUMMARY

In order to achieve the above-mentioned object, the present disclosure provides in embodiments a power steering method, a power steering device, and a vehicle.

In a first aspect of the present disclosure, a power steering method is provided. The power steering method is applied to a vehicle including a power steering assembly, and includes: detecting whether a direction changing wheel of the vehicle is a driving wheel, in which the direction changing wheel of the vehicle is a front wheel or a rear wheel of the vehicle; determining a power assisted gear position of the power steering assembly according to whether the direction changing wheel of the vehicle is the driving wheel; and controlling the power steering assembly to generate a power steering torque according to the power assisted gear position of the power steering assembly.

In a second aspect of the present disclosure, a power steering device is provided. The power steering device is applied to a vehicle including a power steering assembly. The power steering device includes: a controller configured to detect whether a direction changing wheel of the vehicle is a driving wheel, in which the direction changing wheel of the vehicle is a front wheel or a rear wheel of the vehicle; determine a power assisted gear position of the power steering assembly according to whether the direction changing wheel of the vehicle is the driving wheel; and control the power steering assembly to generate a power steering torque according to the power assisted gear position of the power steering assembly.

In a third aspect of the present disclosure, a vehicle is provided. The vehicle includes the power steering device as described above.

DETAILED DESCRIPTION

Figure 1:
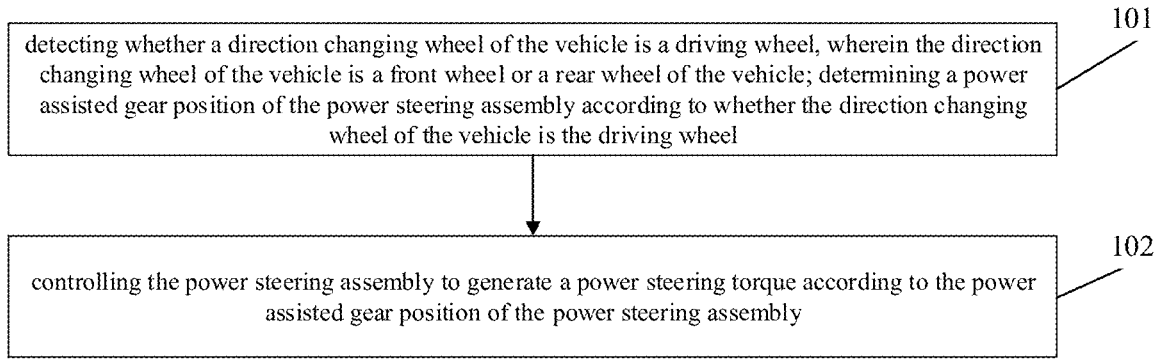
FIG. 1 is a flow chart of a power steering method according to an embodiment of the present disclosure.

Embodiments of the present disclosure are described in detail below, examples of which are illustrated in the drawings. The same or similar elements are denoted by same reference numerals in different drawings unless indicated otherwise. The embodiments described herein with reference to drawings are explanatory, and used to generally understand the present disclosure. The embodiments shall not be construed to limit the present disclosure.

It should be understood that, for ease of illustration, sizes of various parts shown in the drawings are not necessarily drawn in accordance with actual proportional relationships of the various parts. In addition, technologies, methods, and devices known to those skilled in the art may not be discussed in detail in the present disclosure, but should be regarded as part of the specification.

A vehicle in the embodiments of the present disclosure may be four-wheel ATVs and snowmobiles. The vehicle may have a direction control component, a power steering assembly, and a steering machine. The steering machine is connected to a direction changing wheel (for example, a front wheel or a rear wheel of the vehicle). The direction control component may be a steering wheel or a steering handle. A user rotates the direction control component to control steering of the vehicle. For example, the user rotates the direction control component to the right to control the vehicle to turn the right. For another example, the user rotates to the direction control component to the left, to control the vehicle to turn to the left. The power steering assembly can be realized by the EPS. One end of the power steering assembly is connected to the direction control component, and the other end is connected to the direction changing wheel. The user rotates the direction control component with a small force, and the power steering assembly controls the motor to provide a power assisted steering torque to the steering machine according to a steering torque and a steering angle of the direction control component, and a vehicle speed, thereby driving the front wheels to achieve the steering.

However, the power assisted steering torque provided by the existing power steering assembly of the vehicle lacks flexibility, and thus different application requirements for various scenarios cannot be met.

For example, if the direction changing wheel of the vehicle is used to provide a driving force (that is, the direction changing wheel is the driving wheel), the power steering torque provided by the power steering assembly may be insufficient. For another example, if the direction changing wheel of the vehicle is not used to provide a driving force (that is, the direction changing wheel is not the driving wheel), the power steering torque provided by the power steering assembly may be excessive. On this basis, the following technical solutions of the embodiments of the present disclosure are provided. It should be noted that the "direction changing wheel" in the embodiments of the present disclosure may also be referred to as a "directional wheel".

FIG. 1 is a flow chart of a power steering method according to an embodiment of the present disclosure. The power steering method may be applied to a vehicle, such as a four-wheel ATV, including a power steering assembly. As shown in FIG. 1, the power steering method includes the following steps.

In block 101, it is detected whether a direction changing wheel of the vehicle is a driving wheel. The direction changing wheel of the vehicle is a front wheel or a rear wheel of the vehicle. A power assisted gear position of the power steering assembly is determined according to whether the direction changing wheel of the vehicle is the driving wheel.

In an embodiment of the present disclosure, the vehicle has a setting control for a drive mode of the vehicle, and the user may set the drive mode of the vehicle by the setting control. For example, the vehicle has one setting control, and the user may set the drive mode of the vehicle to be a two-wheel drive mode, a first all-wheel drive mode, or a second all-wheel drive mode by the setting control. For another example, the vehicle has three setting controls, i.e., switch 1 for the two-wheel drive mode, switch 2 for the first all-wheel drive mode, and switch 3 for the second four-wheel drive mode. The user may set the drive mode of the vehicle to be the two-wheel drive mode by switch 1, set the drive mode of the vehicle to be the first all-wheel drive mode by switch 2, and set the drive mode of the vehicle to be the second all-wheel drive mode by switch 3.

The two-wheel drive mode refers to a mode in which the direction changing wheel of the vehicle is not the driving wheel. In an example, the direction changing wheel is the front wheel of the vehicle, and correspondingly, the two-wheel drive mode refers to a mode in which the driving force is provided by the rear wheels of the vehicle. In this case, the rear wheels may be in an unlocked differential state or in a locked differential state. In another example, the direction changing wheel is the rear wheel of the vehicle, and correspondingly, the two-wheel drive mode refers to a anode in which the driving force is provided by the front wheels. In this case, the front wheels may be in the unlocked differential state or in the locked differential state.

The first all-wheel drive mode refers to a mode in which the direction changing wheel of the vehicle is the driving wheel and in the unlocked differential state. In an example, the direction changing wheel is the front wheel of the vehicle, and correspondingly, the first all-wheel drive mode refers to a mode in which the driving force is provided by the front and rear wheels of the vehicle, and the front wheels are in the unlocked differential state. In this case, the rear wheels may be in the unlocked differential state or in the locked differential state. In another example, the direction changing wheel is the rear wheel of the vehicle, and correspondingly, the first all-wheel drive mode refers to a mode in which the driving force is provided by the front and rear wheels of the vehicle, and the rear wheels are in the unlocked differential state. In this case, the front wheels may be in the unlocked differential state or in the locked differential state.

The second all-wheel drive mode refers to a mode in which the direction changing wheel of the vehicle is the driving wheel and in the locked differential state. In an example, the direction changing wheel is the front wheel of the vehicle, and correspondingly, the second all-wheel drive mode refers to a mode in which the driving force is provided by the front and rear wheels of the vehicle, and the front wheels are in the locked differential state. In this case, the rear wheels may be in the unlocked differential state or in the locked differential state. In another example, the direction changing wheel is the rear wheel of the vehicle, and correspondingly, the second all-wheel drive mode refers to a mode in which the driving force is provided by the front and rear wheels of the vehicle, and the rear wheels are in the locked differential state. In this case, the front wheels may be in the unlocked differential state or in the locked differential state.

It should be noted that the fact that the front wheels are in the unlocked differential state means that rotation of the front left wheel and rotation of the front right wheel are independent, and may be the same or different. The fact that the front wheels are in the locked differential state means that rotate speeds of the front left wheel and the front right wheel are the same, and thus there is no difference in speed between the front left wheel and the front right wheel. Similarly, the fact that the rear wheels are in the unlocked differential state means that rotation of the rear left wheel and rotation of the rear right wheel are independent, and may be the same or different. The fact that the rear wheels are in the locked differential state means that rotate speeds of the rear left wheel and the rear right wheel are the same, and thus there is no difference in speed between the rear left wheel and the rear right wheel.

It should be noted that the "unlocked differential state" in the embodiments of the present disclosure may also be referred to as a "differential state". The "locked differential state" in the embodiments of the present disclosure may also be referred to as a "locked state".

In the embodiments of the present disclosure, different drive modes correspond to different power assisted gear positions. The controller detects whether the direction changing wheel of the vehicle is the driving wheel, determines a current drive mode, and further determines the power assisted gear position of the power steering assembly according to the current drive mode of the vehicle. Different situations are separately described below.

First situation: two-wheel drive mode

When the direction changing wheel of the vehicle is not the driving wheel, it is determined that the drive mode of the vehicle is the two-wheel drive mode. Based on the two-wheel drive mode of the vehicle, it is determined that the power steering assembly is in a first power assisted gear position.

In this situation, the two-wheel drive mode refers to a mode in which the driving force is provided by non-direction changing wheels. In other words, the direction changing wheel of the vehicle provides no driving force. The non-direction changing wheel may be in the unlocked differential state or in the locked differential state.

In this situation, the direction changing wheel may be the front wheel of the vehicle, and accordingly, the non-direction changing wheel refers to the rear wheel of the vehicle. Alternatively, the direction changing wheel may be the rear wheel of the vehicle, and accordingly, the non-direction changing wheel refers to the front wheel of the vehicle.

Second situation: first all-wheel drive mode

When the direction changing wheel of the vehicle is the driving wheel and in the unlocked differential state, it is determined that the drive mode of the vehicle is the first all-wheel drive mode. Based on the first all-wheel drive mode of the vehicle, it is determined that the power steering assembly is in a second power assisted gear position. A power steering torque generated by the second power assisted gear position is higher than a power steering torque generated by a first power assisted gear position.

In this situation, the first all-wheel drive anode refers to a mode in which the driving force is provided by the direction changing wheels and the non-direction changing wheels and the direction changing wheel is in the unlocked differential state. The non-direction changing wheels may be in the unlocked differential state or in the locked differential state.

In this situation, the direction changing wheel may be the front wheel of the vehicle, and accordingly, the non-direction changing wheel refers to the rear wheel of the vehicle. Alternatively, the direction changing wheel may be the rear wheel of the vehicle, and accordingly, the non-direction changing wheel refers to the front wheel of the vehicle.

Third situation: second all-wheel drive mode

When the direction changing wheel of the vehicle is the driving wheel and in the locked differential state, it is determined that the drive mode of the vehicle is the second all-wheel drive mode. Based on the second all-wheel drive mode of the vehicle, it is determined that the power steering assembly is in a third power assisted gear position. A power steering torque generated by the third power assisted gear position is higher than the power steering torque generated by the second power assisted wear position.

In this situation, the second all-wheel drive mode refers to a mode in which the driving tierce is provided by the direction changing wheels and the non-direction changing wheels and the direction changing wheel is in the locked differential state. The non-direction changing wheels may be in the unlocked differential state or in the locked differential state.

In this situation, the direction changing wheel may be the front wheel of the vehicle, and accordingly, the non-direction changing wheel refers to the rear wheel of the vehicle. Alternatively, the direction changing wheel may be the rear wheel of the vehicle, and accordingly, the non-direction changing wheel refers to the front wheel of the vehicle.

It should be noted that in the above solution, the two-wheel drive mode may be referred as a two-wheel drive state. The first all-wheel drive mode may be referred as an all-wheel drive state. The second all-wheel drive mode may be referred as an all-wheel locked state.

It should be noted that in the above situations, the first power assisted gear position is lower than the second power assisted gear position, and the second power assisted gear position is lower than the third power assisted gear position. When the user rotates the direction control component in the same way (such as under conditions of same steering torque and same steering angle), the power steering torque generated by the power steering assembly in the first power assisted gear position is lower than the power steering torque generated by the power steering assembly in the second power assisted gear position, and the power steering torque generated by the power steering assembly in the second power assisted gear position is lower than the power steering torque generated by the power steering assembly in the third power assisted gear position. On this basis, the first power assisted gear position may be referred as a low power assisted gear position, the second power assisted gear position may be referred as a medium power assisted gear position, and the third power assisted gear position may be referred as a high power assisted gear position.

It should be noted that the present disclosure is illustrated by three power assisted gears positions, however, the number of gear positions is not limited, and the power assisted gear positions of the present disclosure may be more than three. For example, the driving force is provided by the front wheels, and the rear wheels provide no driving force. The front wheels may be in the unlocked differential state (which may also be referred as a front drive and unlocked differential state), which corresponds to one power assisted gear position. Alternatively, the front wheels may be in the locked differential state (which may also be referred as a front drive and locked differential state), which corresponds to another power assisted gear position. Moreover, a power steering torque generated in the power assisted gear position where the front wheels are in the locked differential state is higher than a power steering torque generated in the power assisted gear position where the front wheels are in the unlocked differential state.

In block 102, the power steering assembly is controlled to generate the power steering torque according to the power assisted gear position of the power steering assembly.

In an embodiment of the present disclosure, the user rotates the direction control component, and steering data such as a steering torque and a steering angle of the direction control component can be detected by sensor(s) provided on the direction control component. For example, the steering torque of the direction control component may be detected by a steering torque sensor. The steering angle of the direction control component may be detected by a steering angle sensor. The controller controls the power steering assembly to generate the power steering torque based on the steering data of the direction control component and the current power assisted gear position of the power steering assembly.

In an embodiment of the present disclosure, the vehicle has a display component. For example, the display component may be a liquid crystal display, such as an instrument display. The drive mode of the vehicle and/or the power assisted gear position of the power steering assembly are displayed on the display component of the vehicle. In this way, the user can notice the current drive mode of the vehicle and/or the current power assisted gear position of the power steering assembly by viewing the display component. The driving mode of the vehicle is determined based on whether the direction changing wheel of the vehicle is the driving wheel.

In an embodiment of the present disclosure, the vehicle has a communication component (referred as a second communication component hereafter). The second communication component is configured to send third information to a terminal, and the third information is used to indicate the current drive mode of the vehicle and/or the power assisted gear position of the power steering assembly. The drive mode of the vehicle and/or the power assisted gear position of the power steering assembly is displayed on the terminal. The drive mode of the vehicle is determined according to whether the direction changing wheel of the vehicle is the driving wheel. It should be noted that an application (APP) corresponding to the vehicle is installed on the terminal, and the APP of the terminal may realize a remote control of the vehicle. Furthermore, the terminal can display the drive mode of the vehicle and/or the power assisted gear position of the power steering assembly through the APP in real time.

In the technical solution of the embodiments of the present disclosure, the power assisted gear position of the power steering assembly is determined according to whether the direction changing wheel of the vehicle is the driving wheel, and the power steering assembly is controlled to generate the power steering torque according to the power assisted gear position of the power steering assembly. In this way, the power assisted gear of the power steering assembly can be flexibly adjusted according to whether the direction changing wheel of the vehicle is the driving wheel, to allow the power steering assembly to generate an appropriate power steering torque, thus improving ride comfort of the vehicle for the user.

Figure 2:
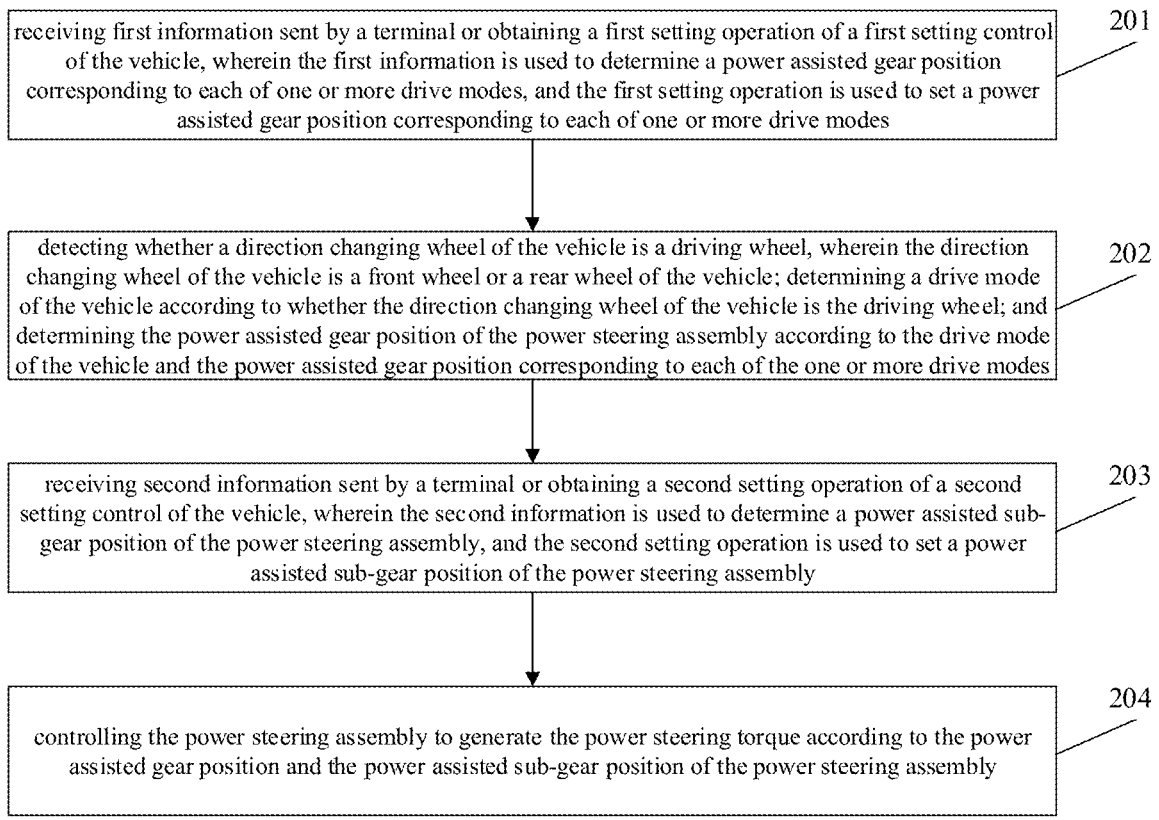
FIG. 2 is a flow chart of a power steering method according to another embodiment of the present disclosure.

FIG. 2 is a flow chart of a power steering method according to another embodiment of the present disclosure. The power steering method may be applied to a vehicle, such as a four-wheel ATV, including a power steering assembly. As shown in FIG. 2, the power steering method includes the following steps.

In block 201, first information sent by a terminal is received or a first setting operation of a first setting control of the vehicle is obtained. The first information is used to determine a power assisted gear position corresponding to each of one or more drive modes. The first setting operation is used to set a power assisted gear position corresponding to each of one or more drive modes.

The terminal may be a terminal such as a mobile phone, a tablet computer and a wearable device. An application (APP) corresponding to the vehicle is installed on the terminal, and the terminal can realize the remote control of the vehicle through the APP.

In an embodiment of the present disclosure, the power assisted gear position corresponding to each of the one or more drive modes may be set by the user through the APP of the terminal. For example, the user sets the two-wheel drive mode to correspond to the first power assisted gear position, sets the first all-wheel drive mode correspond to the second power assisted gear position, and sets the second all-wheel drive mode correspond to the third power assisted gear position. The terminal sends the information set by the user on the APP (i.e., the first information) to the controller of the vehicle. Accordingly, the controller of the vehicle receives the first information sent by the terminal, and determines the power assisted gear position corresponding to each of the one or more drive modes according to the first information.

In another embodiment of the present disclosure, the power assisted gear position corresponding to each of the one or more drive modes may be set by the user through the first setting control of the vehicle. For example, the user sets the two-wheel drive mode to correspond to the first power assisted gear position, sets the first all-wheel drive mode correspond to the second power assisted gear position, and sets the second all-wheel drive mode correspond to the third power assisted gear position.

It should be noted that torque values corresponding to different power assisted gear position are different. In an embodiment, the torque values corresponding to the different power assisted gear positions may be adjusted when the vehicle leaves the factory. In another embodiment, the user may set the torque values corresponding to the different power assisted gear positions through the APP of the terminal. In yet another embodiment, the user may set the torque values corresponding to the different power assisted gear positions through the setting control of the vehicle.

In block 202, it is detected whether the direction changing wheel of the vehicle is the driving wheel. The direction changing wheel of the vehicle is the front wheel or the rear wheel of the vehicle. The drive mode of the vehicle is determined according to whether the direction changing wheel of the vehicle is the driving wheel. The power assisted gear position of the power steering assembly is determined according to the drive mode of the vehicle and the power assisted gear position corresponding to each of the one or more drive modes.

In an embodiment of the present disclosure, the vehicle has the setting control for the drive mode of the vehicle, and the user may set the drive mode of the vehicle by the setting control. For example, the vehicle has one setting control, and the user may set the drive mode of the vehicle to be a two-wheel drive mode, a first all-wheel drive mode, or a second all-wheel drive mode by the setting control. For another example, the vehicle has three setting controls, i.e., switch 1 for the two-wheel drive mode, switch 2 for the first all-wheel drive mode, and switch 3 for the second four-wheel drive mode. The user may set the drive mode of the vehicle to be the two-wheel drive mode by switch 1, set the drive mode of the vehicle to be the first all-wheel drive mode by switch 2, and set the drive mode of the vehicle to be the second all-wheel drive mode by switch 3.

In the embodiments of the present disclosure, different drive modes correspond to different power assisted gear positions. The controller detects whether the direction changing wheel of the vehicle is the driving wheel, determines a current drive mode, and further determines a current power assisted gear position of the power steering assembly according to the current drive mode of the vehicle and the current power assisted gear position corresponding to each drive mode preset by the operations as described in block 201. Different situations are separately described below.

First situation: two-wheel drive mode

When the direction changing wheel of the vehicle is not the driving wheel, it is determined that the drive mode of the vehicle is the two-wheel drive mode. Based on the two-wheel drive mode of the vehicle, it is determined that the power steering assembly is in a first power assisted gear position.

In this situation, the two-wheel drive mode refers to a mode in which the driving force is provided by non-direction changing wheels, in other words, the direction changing wheel of the vehicle provides no driving force. The non-direction changing wheel may be in the unlocked differential state or in the locked differential state.

In this situation, the direction changing wheel may be the front wheel of the vehicle, and accordingly, the non-direction changing wheel refers to the rear wheel of the vehicle. Alternatively, the direction changing wheel may be the rear wheel of the vehicle, and accordingly, the non-direction changing wheel refers to the front wheel of the vehicle.

Second situation: first all-wheel drive mode

When the direction changing wheel of the vehicle is the driving wheel and in the unlocked differential state, it is determined that the drive mode of the vehicle is the first all-wheel drive mode. Based on the first all-wheel drive mode of the vehicle, it is determined that the power steering assembly is in a second power assisted gear position.

In this situation, the first all-wheel drive mode refers to a mode in which the driving force is provided by the direction changing wheels and the non-direction changing wheels and the direction changing wheel is in the unlocked differential state. The non-direction changing wheels may be in the unlocked differential state or in the locked differential state.

In this situation, the direction changing wheel may be the front wheel of the vehicle, and accordingly, the non-direction changing wheel refers to the rear wheel of the vehicle. Alternatively, the direction changing wheel may be the rear wheel of the vehicle, and accordingly, the non-direction changing wheel refers to the front wheel of the vehicle.

Third situation: second all-wheel drive mode

When the direction changing wheel of the vehicle is the driving wheel and in the locked differential state, it is determined that the drive mode of the vehicle is the second all-wheel drive mode. Based on the second all-wheel drive mode of the vehicle, it is determined that the power steering assembly is in a third power assisted gear position. A power steering torque generated by the third power assisted gear position is higher than the power steering torque generated by the second power assisted gear position.

In this situation, the second all-wheel drive mode refers to a mode in which the driving tierce is provided by the direction changing wheels and the non-direction changing wheels and the direction changing wheel is in the locked differential state. The non-direction changing wheels may be in the unlocked differential state or in the locked differential state.

In this situation, the direction changing wheel may be the front wheel of the vehicle, and accordingly, the non-direction changing wheel refers to the rear wheel of the vehicle. Alternatively, the direction changing wheel may be the rear wheel of the vehicle, and accordingly, the non-direction changing wheel refers to the front wheel of the vehicle.

It should be noted that in the above solution, the two-wheel drive mode may be referred as a two-wheel drive state. The first all-wheel drive mode may be referred as an all-wheel drive state. The second all-wheel drive mode may be referred as an all-wheel locked state.

It should be noted that in the above situations, the first power assisted gear position is lower than the second power assisted gear position, and the second power assisted gear position is lower than the third power assisted gear position. When the user rotates the direction control component in the same way (such as under conditions of same steering torque and same steering angle), the power steering torque generated by the power steering assembly in the first power assisted gear position is lower than the power steering torque generated by the power steering assembly in the second power assisted gear position, and the power steering torque generated by the power steering assembly in the second power assisted gear position is lower than the power steering torque generated by the power steering assembly in the third power assisted gear position. On this basis, the first power assisted gear position may be referred as a low power assisted gear position, the second power assisted gear position may be referred as a medium power assisted gear position, and the third power assisted gear position may be referred as a high power assisted gear position.

It should be noted that the three power assisted gears positions of the present disclosure are only illustrated, and shall not be construed to limit the present disclosure. In the present disclosure, the vehicle may have other types of the drive modes, and the number of gear positions may be increased. For example, the driving force is provided by the front wheels, and the rear wheels provide no driving force. The front wheels may be in the unlocked differential state (which may also be referred as a front drive and unlocked differential state), which corresponds to one power assisted gear position. Alternatively, the front wheels may be in the locked differential state (which may also be referred as a front drive and locked differential state), which corresponds to another power assisted gear position. Moreover, a power steering torque generated in the power assisted gear position where the front wheels are in the locked differential state is higher than a power steering torque generated in the power assisted gear position where the front wheels are in the unlocked differential state.

In block 203, second information sent by a terminal is received or a second setting operation of a second setting control of the vehicle is obtained. The second information is used to determine a power assisted sub-gear position of the power steering assembly. The second setting operation is used to set a power assisted sub-gear position of the power steering assembly.

In an embodiment of the present disclosure, the user may set a specific power assisted sub-gear position through the APP of the terminal. For example, the user may set the power assisted sub-gear position of the vehicle to be a first power assisted sub-gear position, a second power assisted sub-gear position, a third power assisted sub-gear position, a fourth power assisted sub-gear position or a fifth power assisted sub-gear position. The terminal sends the information set by the user on the APP (i.e., the second information) to the controller of the vehicle. Accordingly, the controller of the vehicle receives the second information sent by the terminal, and determine the power assisted sub-gear position according to the second information.

In another embodiment of the present disclosure, the vehicle may have the setting control for the power assisted sub-gear position, and the user may set a specific power assisted sub-gear position through the setting control. For example, the vehicle has one setting control for the power assisted sub-gear position, the user may set the power assisted sub-gear position of the vehicle to be the first power assisted sub-gear position, the second power assisted sub-gear position, the third power assisted sub-gear position, the fourth power assisted sub-gear position or the fifth power assisted sub-gear position through the setting control. It should be noted that the five power assisted sub-gear positions are only an example for illustration, and shall not be construed to limit the present disclosure. It is possible for the present disclosure to have any other number of the power assisted sub-gear positions.

It should be noted that different power assisted sub-gear positions correspond to different degrees of the power to be assisted. When the user rotates the direction control component in the same way (such as under conditions of same steering torque and same steering angle), a power steering torque generated in a first power assisted sub-gear position of a power assisted gear position is lower than a power steering torque generated in a second power assisted sub-gear position of such a power assisted gear position.

In the embodiments of the present disclosure, the power assisted gear position is a relative rough measure of the power, and the sub-gear position is a relative fine measure of the power. For example, one power-assisted gear position may be divided into 5 power assisted sub-gear positions corresponding to different degrees of the assisted power.

In an application scenario, different users may have different requirements for the degree of assisted power when driving the vehicle. When the power steering assembly is in a power assisted gear position, user A may further fine-tune the degree of the assisted power, for example, adjust the degree of the assisted power to the first power assisted sub-gear position. For another example, user B may further fine-tune the degree of the assisted power to a second power assisted sub-gear position.

In block 204, the power steering assembly is controlled to generate the power steering torque according to the power assisted gear position and the power assisted sub-gear position of the power steering assembly.

In an embodiment of the present disclosure, the user rotates the direction control component, and steering data such as a steering torque and a steering angle of the direction control component can be detected by sensor(s) provided on the direction control component. For example, the steering torque of the direction control component may be detected by a steering torque sensor. The steering angle of the direction control component may be detected by a steering angle sensor. The controller controls the power steering assembly to generate the power steering torque based on the steering data of the direction control component and current power assisted gear position and sub-gear position of the power steering assembly.

In an embodiment of the present disclosure, the vehicle has a display component. For example, the display component may be a liquid crystal display. The drive mode of the vehicle and/or the power assisted gear position of the power steering assembly are displayed on the display component of the vehicle. In this way, the user can notice the current drive mode of the vehicle and/or the current power assisted gear position of the power steering assembly by viewing the display component. The driving mode of the vehicle is determined based on whether the direction changing wheel of the vehicle is the driving wheel.

In an embodiment of the present disclosure, the vehicle has a communication component (referred as a second communication component hereafter). The second communication component is configured to send third information to a terminal, and the third information is used to indicate the drive mode of the vehicle and/or the power assisted gear position of the power steering assembly. The drive mode of the vehicle and/or the power assisted gear position of the power steering assembly is displayed on the terminal. The drive mode of the vehicle is determined according to whether the direction changing wheel of the vehicle is the driving wheel. It should be noted that an application (APP) corresponding to the vehicle is installed on the terminal, and the APP of the terminal may realize a remote control of the vehicle. Furthermore, the terminal can display the current drive mode of the vehicle and/or the current power assisted gear position of the power steering assembly through the APP in real time.

In the technical solution of the embodiments of the present disclosure, the power assisted gear position of the power steering assembly is determined according to the current drive mode of the vehicle, and the power steering assembly is controlled to generate the power steering torque according to the power assisted gear position of the power steering assembly. In this way, the power assisted gear of the power steering assembly can be flexibly adjusted according to the drive mode of the vehicle, to allow the power steering assembly to generate an appropriate power steering torque, thus improving ride comfort of the vehicle for the user. Moreover, the user may customize the power assisted gear position for different drive modes, thereby improving driving pleasure. In addition, the degree of the assisted power may be fine-tuned through the power assisted sub-gear position according to operation habit of the user.

The technical solutions of the embodiments of the present disclosure will be illustrated below with reference to specific application examples. It should be noted that in the following application examples, the power steering assembly described in the embodiments of the present disclosure is the EPS, the controller described in the embodiments is a data transaction system (DTS), and the display component described in the embodiments is a dashboard display.

As shown in FIGS. 3-7, the present disclosure provides in embodiments a power steering system. This system includes a vehicle as described above, an internet platform, and a terminal. The internet platform is configured to establish a communication between the vehicle and the terminal. In this system, the power steering device is operated according to different drive modes as follows.

First Application Example

Figure 3:
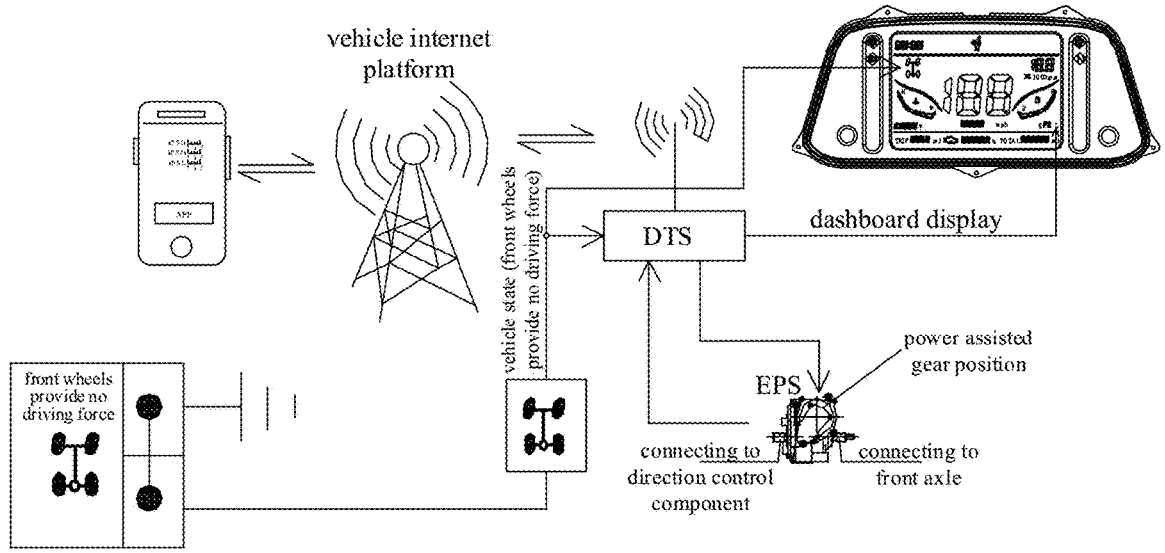
FIG. 3 is a schematic diagram of a first application example according to an embodiment of the present disclosure.

As shown in FIG. 3, the drive mode set by the user is the two-wheel drive mode where the driving force is provided by the rear wheels and the front wheels provide no driving force. After the DTS receives set signal of the two-wheel drive mode, it communicates with the EPS through a controller area network (CAN) bus or a hard wire. Specifically, the DTS sends control commands to the EPS, and the EPS executes the control commands of the DTS to automatically switch to a power assisted gear position corresponding to the two-wheel drive mode.

In this example, different drive modes correspond to different power assisted gear positions. The user presets the power assisted gear positions (different power assisted gear positions correspond to different torque values) for the different drive modes through the APP of the terminal. The terminal sends the information set by the user through the APP to the DTS via an internet platform, and the DTS determines the power assisted gear position corresponding to the two-wheel drive mode according to the information.

If the DTS does not receive the information of the power assisted gear positions for the different drive modes preset by the user, the DTS may determine the power assisted gear position corresponding to the two-wheel drive mode according to default information.

The dashboard display displays the drive mode (i.e., a driving force state) of the vehicle and the current power assisted gear position of the EPS (i.e., a current operating state of the EPS). Furthermore, the DTS may synchronize the drive mode (i.e., the driving force state) of the vehicle and the current power assisted gear position of the EPS (i.e., the current operating state of the EPS) to the APP installed on the terminal through the vehicle internet platform. The drive mode (i.e., the driving force state) of the vehicle and the current power assisted gear position of the EPS (i.e., the current operating state of the EPS) may be displayed by the APP. Further, a fine-tuning of the degree of the assisted power may be realized by adjusting the power assisted sub-gear position of the EPS according to the requirements of the user.

Second Application Example

Figure 4:
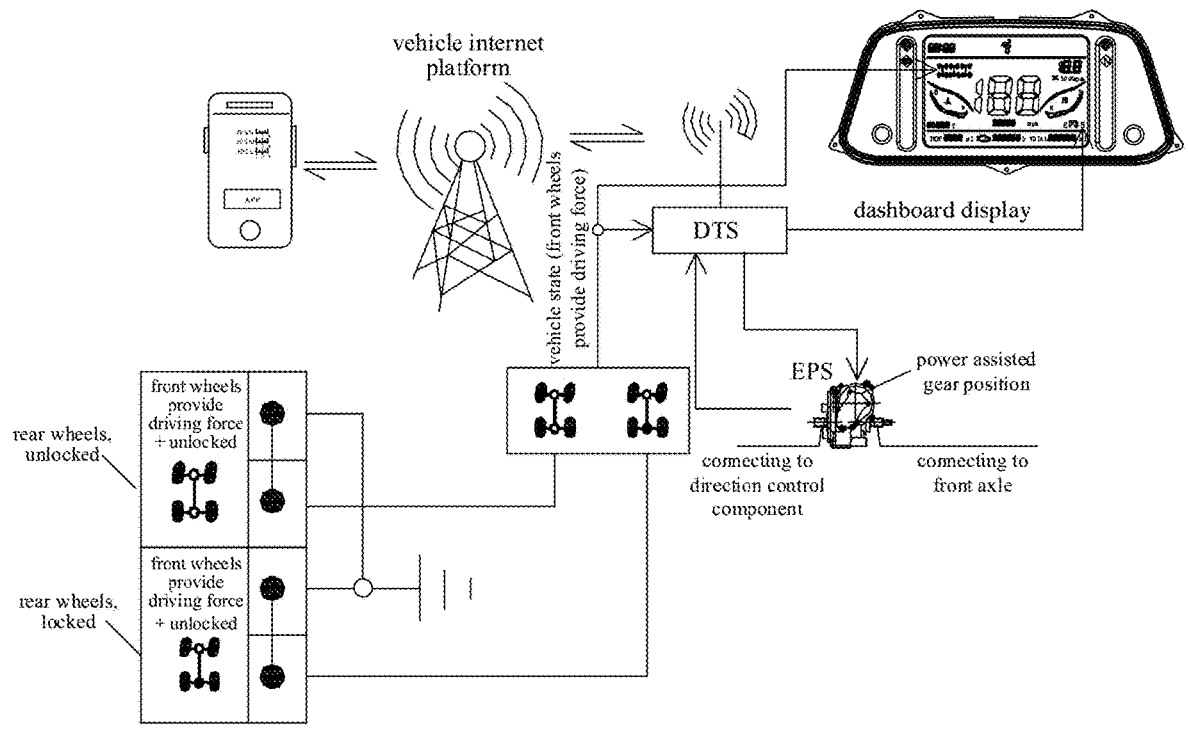
FIG. 4 is a schematic diagram of a second application example according to an embodiment of the present disclosure.

As shown in FIG. 4, the drive mode set by the user is the first all-wheel drive mode where the driving force is provided by the rear wheels and the front wheels, the front wheels are in the unlocked differential state, and the rear wheels are in the unlocked or locked differential state. After the DTS receives set signal of the first all-wheel drive mode, it communicates with the EPS through the CAN bus or the hard wire. Specifically, the DTS sends control commands to the EPS, and the EPS executes the control commands of the DTS to automatically switch to a power assisted gear position corresponding to the first all-wheel drive mode.

In this example, different drive modes correspond to different power assisted gear positions. The user presets the power assisted gear positions (different power assisted gear positions correspond to different torque values) for the different drive modes through the APP of the terminal. The terminal sends the information set by the user through the APP to the DTS via the internet platform, and the DTS determines the power assisted gear position corresponding to the first all-wheel drive mode according to the information.

If the DTS does not receive the information of the power assisted gear positions for the different drive modes preset by the user, the DTS may determine the power assisted gear position corresponding to the first all-wheel drive mode according to default information.

The dashboard display displays the drive mode (i.e., the driving force state) of the vehicle and the current power assisted gear position of the EPS (i.e., the current operating state of the EPS). Furthermore, the DTS may synchronize the drive mode (i.e., the driving force state) of the vehicle and the current power assisted gear position of the EPS (i.e., the current operating state of the EPS) to the APP installed on the terminal through the vehicle internet platform. The drive mode (i.e., the driving force state) of the vehicle and the current power assisted gear position of the EPS (i.e., the current operating state of the EPS) may be displayed by the APP. Further, a fine-tuning of the degree of the assisted power may be realized by adjusting the power assisted sub-gear position of the EPS according to the requirements of the user.

Third Application Example

Figure 5:
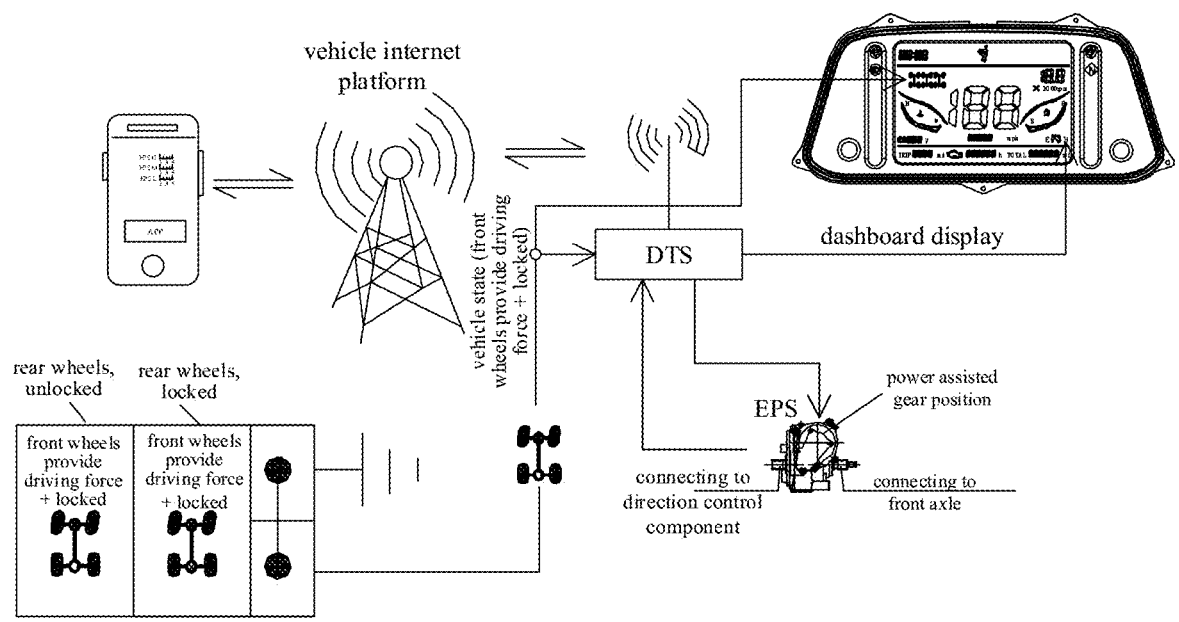
FIG. 5 is a schematic diagram of a third application example according to an embodiment of the present disclosure.

As shown in FIG. 5, the drive mode set by the user is the second all-wheel drive mode where the driving force is provided by the rear wheels and the front wheels, the front wheels are in the locked differential state, and the rear wheels are in the unlocked or locked differential state.

In this example, different drive modes correspond to different power assisted gear positions. The user presets the power assisted gear positions (different power assisted gear positions correspond to different torque values) for the different drive modes through the APP of the terminal. The terminal sends the information set by the user through the APP to the DTS via the internet platform, and the DTS determines the power assisted gear position corresponding to the second all-wheel drive mode according to the information.

If the DTS does not receive the information of the power assisted gear positions for the different drive modes preset by the user, the DTS may determine the power assisted gear position corresponding to the second all-wheel drive mode according to default information.

The dashboard display displays the drive mode (i.e., the driving force state) of the vehicle and the current power assisted gear position of the EPS (i.e., the current operating state of the EPS). Furthermore, the DTS may synchronize the drive mode (i.e., the driving force state) of the vehicle and the current power assisted gear position of the EPS (i.e., the current operating state of the EPS) to the APP installed on the terminal through the vehicle internet platform. The drive mode (i.e., the driving force state) of the vehicle and the current power assisted gear position of the EPS (i.e., the current operating state of the EPS) may be displayed by the APP. Further, a fine-tuning of the degree of the assisted power may be realized by adjusting the power assisted sub-gear position of the EPS according to the requirements of the user.

Fourth Application Example

Figure 6:
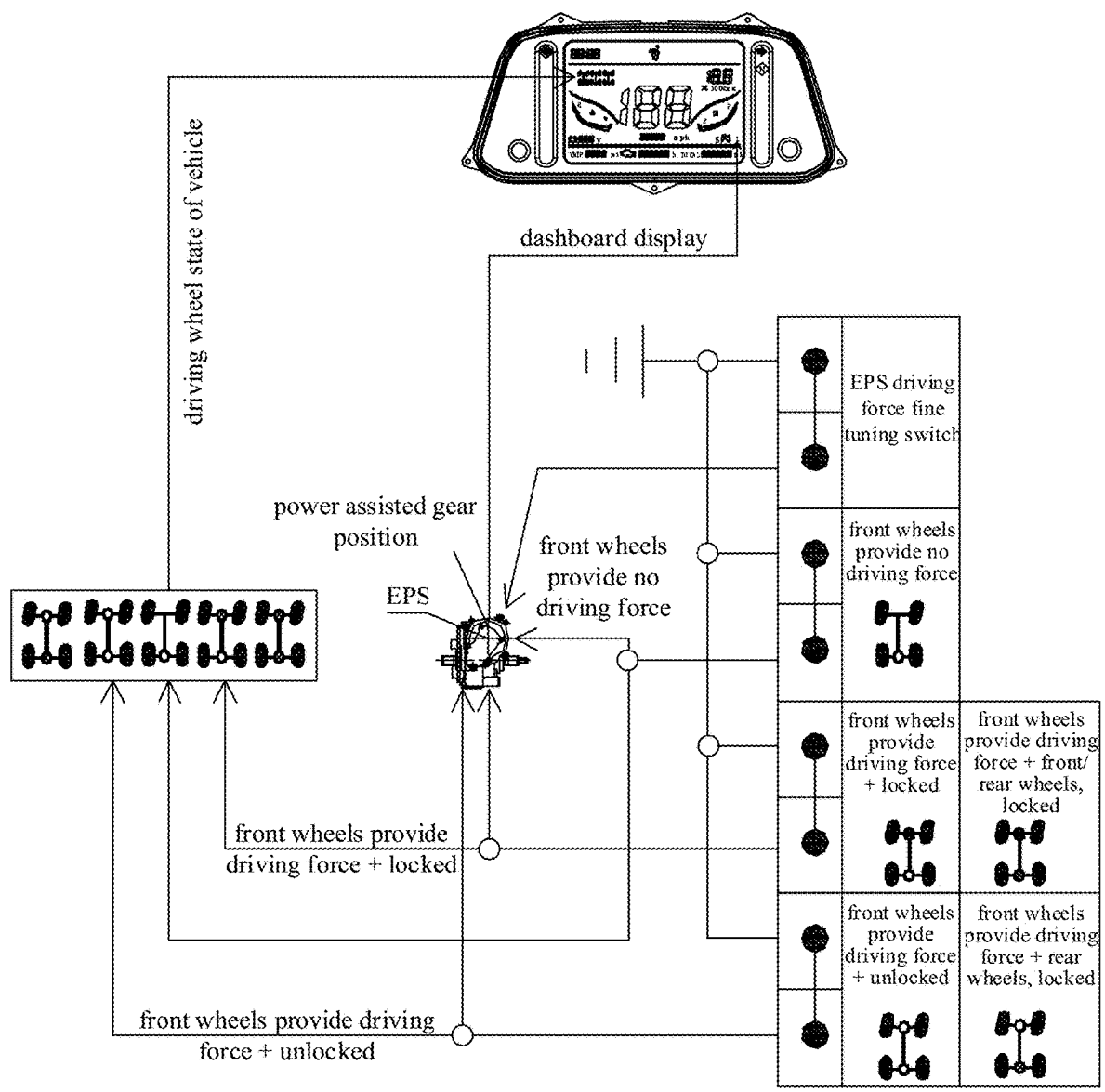
FIG. 6 is a schematic diagram of a fourth application example according to an embodiment of the present disclosure.

As shown in FIG. 6, on the basis of any one of the above application examples, the user may use a fine-tuning switch to fine-tune the degree of the assisted power of the EPS. Specifically, the user may use the fine-tuning switch to set different power assisted sub-gear positions. Different sub-gear positions correspond to different degrees of the assisted power. It should be noted that different degrees of the assisted power refer to different power steering torques provided by the EPS. The dashboard display displays the drive mode (i.e., the driving force state) of the vehicle and the current power assisted gear position of the EPS (i.e., the current operating state of the EPS).

Figure 7:
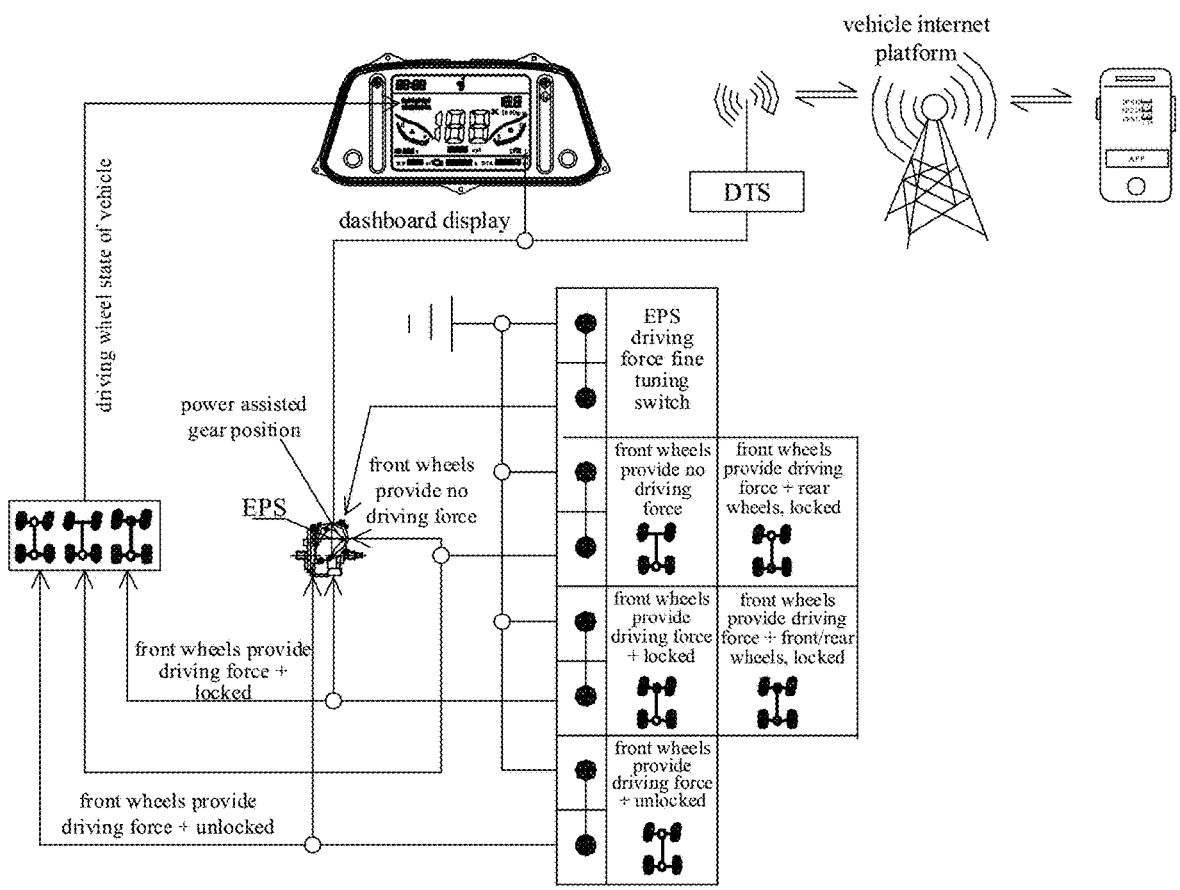
FIG. 7 is a schematic diagram of a fourth application example according to another embodiment of the present disclosure.

Further, as shown in FIG. 7, the DTS may synchronize the drive mode (i.e., the driving force state) of the vehicle and the current power assisted gear position of the EPS (i.e., the current operating state of the EPS) to the APP installed on the terminal through the vehicle internet platform. The drive mode (i.e., the driving force state) of the vehicle and the current power assisted gear position of the EPS (i.e., the current operating state of the EPS) may be displayed by the APP.

In order to perform the above power steering method of the present disclosure, the present disclosure provides a power steering device in embodiments.

Figure 8:
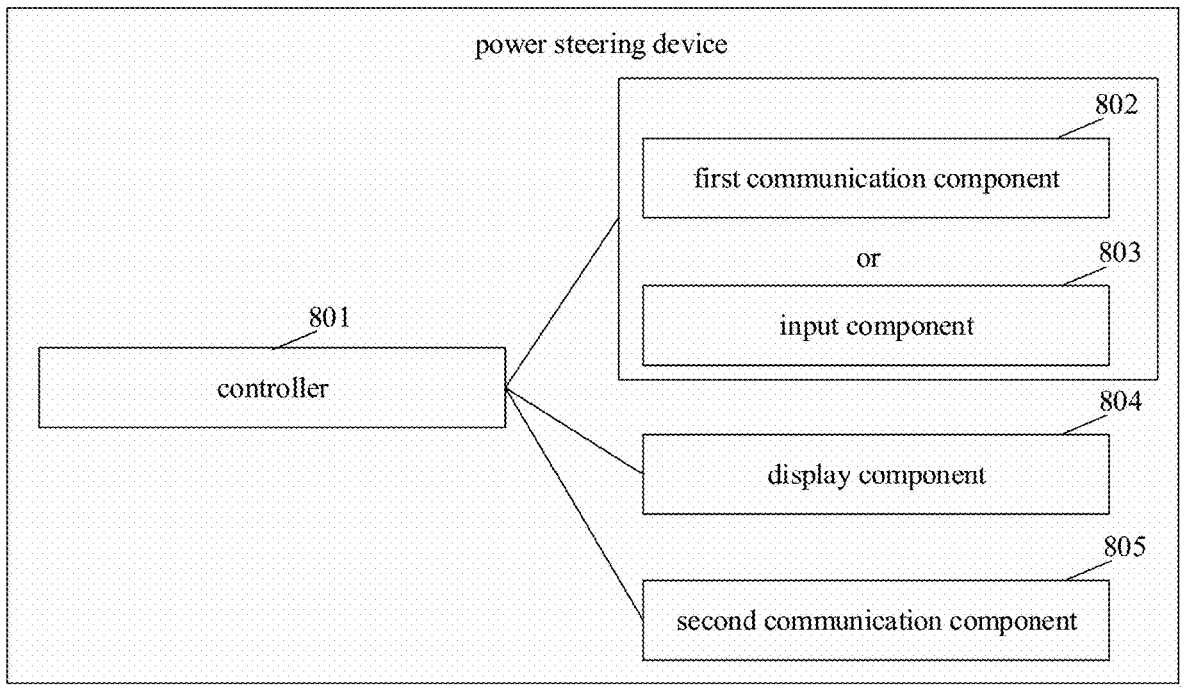
FIG. 8 is a block diagram of a power steering device according to an embodiment of the present disclosure.

FIG. 8 is a block diagram of a power steering device according to an embodiment of the present disclosure. The power steering device is applied to a vehicle including a power steering assembly. As shown in FIG. 8, the power steering device includes a controller 801.

The controller 801 is configured to detect whether a direction changing wheel of the vehicle is a driving wheel, in which the direction changing wheel of the vehicle is a front wheel or a rear wheel of the vehicle determine a power assisted gear position of the power steering assembly according to whether the direction changing wheel of the vehicle is the driving wheel; and control the power steering assembly to generate the power steering torque according to the power assisted gear position of the power steering assembly.

In an embodiment of the present disclosure, the power steering device further includes a first communication component 802 or an input component 803. The first communication component 802 is configured to receive first information sent by a terminal, and the first information is used to determine the power assisted gear position corresponding to each of one or more drive modes. The input component 803 is configured to obtain a first setting operation of a first setting control of the vehicle, and the first setting operation is used to set a power assisted gear position corresponding to each of one or more drive modes. The controller 801 is specifically configured to determine a drive mode of the vehicle according to whether the direction changing wheel of the vehicle is the driving wheel; and determine the power assisted gear position of the power steering assembly according to the drive mode of the vehicle and the power assisted gear position corresponding to each of the one or more drive modes.

In an embodiment of the present disclosure, the power steering device further includes a first communication component 802 or an input component 803. The first communication component 802 is configured to receive second information sent by a terminal, and the second information is used to determine a power assisted sub-gear position of the power steering assembly. The input component 803 is configured to obtain a second setting operation of a second setting control of the vehicle, and the second setting operation is used to set a power assisted sub-gear position of the power steering assembly. The controller 801 is further configured to control the power steering assembly to generate the power steering torque according to the power assisted gear position and the power assisted sub-gear position of the power steering assembly.

In an embodiment of the present disclosure, the controller 801 is specifically configured to determine that the drive mode of the vehicle is a two-wheel drive mode when the direction changing wheel of the vehicle is not the driving wheel; and determine that the power steering assembly is in a first power assisted gear position according to the two-wheel drive mode of the vehicle.

In an embodiment of the present disclosure, the controller 801 is specifically configured to determine that the drive mode of the vehicle is a first all-wheel drive mode when the direction changing wheel of vehicle is the driving wheel and the direction changing wheel is in an unlocked differential state; and determine that the power steering assembly is in a second power assisted gear position according to the first all-wheel drive mode of the vehicle. A power steering torque generated by the second power assisted gear position is higher than a power steering torque generated by a first power assisted gear position.

In an embodiment of the present disclosure, the controller 801 is specifically configured to determine that the drive mode of the vehicle is a second all-wheel drive mode when the direction changing wheel of the vehicle is the driving wheel and the direction changing wheel is in a locked differential state; and determining that the power steering assembly is in a third power assisted gear position according to the second all-wheel drive mode of the vehicle. A power steering torque generated by the third power assisted gear position is higher than a power steering torque generated by a second power assisted gear position.

In an embodiment of the present disclosure, the power steering device further includes a display component 804. The controller 801 is further configured to control the display component 804 to display a drive mode of the vehicle and/or the power assisted gear position of the power steering assembly. The drive mode of the vehicle is determined according to whether the direction changing wheel of the vehicle is the driving wheel.

In an embodiment of the present disclosure, the power steering device further includes a second communication component 805. The second communication component 805 is configured to send third information to a terminal. The third information is used to indicate a drive mode of the vehicle and/or the power assisted gear position of the power steering assembly. The drive mode of the vehicle and/or the power assisted gear position of the power steering assembly is displayed on the terminal. The drive mode of the vehicle is determined according to whether the direction changing wheel of the vehicle is the driving wheel.

It should be understood that the functions of the components in the power steering device shown in FIG. 8 may be realized with reference to the description of the embodiments of the power steering method of the present disclosure. For example, the communication components of the power steering device may be a mobile communication module (such as a 4G module and a 5G module). The controller of the power steering device may be a central processing unit (CPU), a digital signal processor (DSP), a microcontroller unit (MCU) or a field-programmable gate array (FPGA).

In order to realize the power steering method of any embodiment described above, the present disclosure provides in embodiments a vehicle including the power steering device described above. In embodiments, the vehicle may be a two-wheel motorcycle, a three-wheel motorcycle, a four-wheel motorcycle, a snowmobile, an all-terrain vehicle, and the like.

It should be understood that the processor in the embodiments of the present disclosure may be an integrated circuit chip with signal processing capability. The steps/operations of the above method embodiments may be completed by integrated logic circuits in the form of hardware or instructions in the form of software of the processor. The processor may be a general-purpose processor, a DSP, an application specific integrated circuit (ASIC), an FPGA or other programmable logic device, discrete gate or transistor logic device or a discrete hardware component. Methods, steps, and logical block diagrams disclosed in the embodiments of the present disclosure may be implemented or executed. The general-purpose processor may be a microprocessor or any conventional processor. The operations of the method disclosed in the embodiments of the present disclosure may be executed and completed by a hardware decoding processor, or executed and completed by a combination of hardware and software modules in the decoding processor. The software module may be provided in a storage medium known in the art, such as a random access memory, a flash memory, a read-only memory, a programmable read-only memory, or an electrically erasable programmable memory, and a register. The storage medium is stored in the memory, and the processor reads the information in the memory to perform the steps/operations of the above method in combination with the hardware.

It should be understood that the power steering device in the embodiments of the present disclosure further includes a memory for storing computer instructions, and the computer instructions are executed to perform any operation of the power steering method of the present disclosure. The memory may be a volatile memory or a non-volatile memory, or may include both volatile and non-volatile memory. The non-volatile memory may be a read-only memory (ROM), a programmable read-only memory (PROM), an erasable programmable read-only memory (EPROM), and an electrically EPROM (EEPROM) or a flash memory. The volatile memory may be a random access memory (RAM), which is used as an external cache. By way of exemplary but not restrictive description, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a direct Rambus RAM (DR RAM). It should be noted that the memories of the systems and methods described herein may include, but are not limited to, these and any other suitable types of memories.

It should be understood that the above memories are only exemplary and shall not be construed to limit the present disclosure. For example, the memory in the embodiments of the present disclosure may include, but are not limited to, a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a direct Rambus RAM (DR RAM). In other words, the memory in the embodiments of the present disclosure include, but is not limited to, these and any other suitable types of memories.

The present disclosure provides in embodiments a non-transitory computer-readable storage medium having stored therein a computer program that, when executed by a processor, is configured to perform steps of the power steering method of the present disclosure.

The non-transitory computer-readable storage medium may be applied for the power steering device described in the embodiments of the present disclosure. When the computer program is executed by a processor, the processor is configured to perform the operations of the power steering method of any embodiment of the present disclosure, which is performed by the power steering device of the present disclosure. The steps/operations are not elaborated in detail here.

The present disclosure also provides in embodiments a computer program product including computer program instructions.

In an embodiment, the computer program product is applied to the power steering device in the embodiments of the present disclosure. When the computer program instructions are executed by a computer, the computer performs the steps of the power steering method of any embodiment of the present disclosure, which are implemented by the power steering device of the present disclosure. For the sake of brevity, details will not be repeated here.

The present disclosure also provides in embodiments a computer program.

In an embodiment, the computer program is applied to the power steering device according to the embodiments of the present disclosure. When the computer program is executed by a computer, the computer performs the steps of the power steering method of any embodiment of the present disclosure, which are implemented by the power steering device of the present disclosure. For the sake of brevity, details will not be repeated here.

It should be noted that units and algorithm steps of the embodiments herein may be implemented by an electronic hardware, or a combination of a computer software and an electronic hardware. Whether these functions are executed by the hardware or the software depends on the specific application and design constraint conditions of the technical solution. One skilled in the art may use a different method for each of specific applications to realize the described functions, which should not be considered beyond the scope of the present disclosure.

It should be noted that all of the above described features and advantages for the method as described above are also applicable to the devices and units, which will not be elaborated in detail herein.

It should be understood that the disclosed system, device, and method provided in the embodiments of the present disclosure may be implemented in other ways. For example, the device embodiments described above are only illustrative. For example, the division of the components is only a logical function division, and there may be other divisions in actual implementations, for example, multiple units or components may be combined or integrated into another system, or some features may be ignored or not implemented.

In addition, unless specified or limited otherwise, the terms "communicated," "connected," "coupled," and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

The elements described as separate components may or may not be physically separated, and the component displayed as a unit may or may not be a physical unit, that is, the component may be located in one place, or it may be distributed on multiple network units. Some or all of the units may be selected according to actual needs to achieve the object of the embodiments. In addition, the functional units in the various embodiments of the present disclosure may be integrated into one processing unit, or each unit may exist alone physically, or two or more units may be integrated into one unit.

It should be noted that Various embodiments or examples described in the specification, as well as features of such the embodiments or examples, may be combined without conflict. Besides above examples, any other suitable combination should be regarded in the scope of the present disclosure.

Reference throughout this specification to "an embodiment", "some embodiments", "one embodiment", "another example", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example" "in a specific example" or "in some examples" in various places throughout this specification are not necessarily referring to the same embodiment or example of the present disclosure. Furthermore, the particular features, structures, materials, or characteristics may be combined in any suitable manner in one or more embodiments or examples.

It should be noted that, in this context, relational terms such as first and second are used only to distinguish an entity from another entity or to distinguish an operation from another operation without necessarily requiring or implying that the entities or operations actually have a certain relationship or sequence. Moreover, "comprise", "include" or other variants are non-exclusive, thus a process, a method, an object or a device including a series of elements not only include such elements, but also include other elements which may not mentioned, or inherent elements of the process, method, object or device. If there is no further limitation, a feature defined by an expression of "include a . . . " does not mean the process, the method, the object or the device can only have one elements, same elements may also be included.

It should be noted that, although the present disclosure has been described with reference to the embodiments, it will be appreciated by those skilled in the art that the disclosure includes other examples that occur to those skilled in the art to execute the disclosure. Therefore, the present disclosure is not limited to the embodiments.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which may not follow a shown or discussed order according to the related functions in a substantially simultaneous manner or in a reverse order, to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A power steering method, applied to a vehicle comprising a power steering assembly, the power steering method comprising:
    detecting whether a direction changing wheel of the vehicle is a driving wheel, wherein the direction changing wheel of the vehicle is a front wheel or a rear wheel of the vehicle;
    determining a power assisted gear position of the power steering assembly according to whether the direction changing wheel of the vehicle is the driving wheel, comprising:
        determining that a drive mode of the vehicle is a second all-wheel drive mode when the direction changing wheel of the vehicle is the driving wheel and the direction changing wheel is in a locked differential state; and
        determining that the power steering assembly is in a target power assisted gear position according to the second all-wheel drive mode of the vehicle; and
    controlling the power steering assembly to generate a power steering torque according to the power assisted gear position of the power steering assembly.

2. The power steering method according to claim 1, wherein the power steering method further comprises:
    receiving first information sent by a terminal or obtaining a first setting operation of a first setting control of the vehicle, wherein the first information is used to determine a power assisted gear position corresponding to each of one or more drive modes, and the first setting operation is used to set a power assisted gear position corresponding to each of one or more drive modes; and
    determining the power assisted gear position of the power steering assembly according to whether the direction changing wheel of the vehicle is the driving wheel comprises:
    determining a drive mode of the vehicle according to whether the direction changing wheel of the vehicle is the driving wheel; and
    determining the power assisted gear position of the power steering assembly according to the drive mode of the vehicle and the power assisted gear position corresponding to each of the one or more drive modes.

3. The power steering method according to claim 2, wherein the power steering method further comprises:
    receiving second information sent by a terminal or obtaining a second setting operation of a second setting control of the vehicle, wherein the second information is used to determine a power assisted sub-gear position of the power steering assembly, and the second setting operation is used to set a power assisted sub-gear position of the power steering assembly; and controlling the power steering assembly to generate the power steering torque according to the power assisted gear position of the power steering assembly comprises:
 controlling the power steering assembly to generate the power steering torque according to the power assisted gear position and the power assisted sub-gear position of the power steering assembly.

4. The power steering method according to claim 1, wherein determining the power assisted gear position of the power steering assembly according to whether the direction changing wheel of the vehicle is the driving wheel comprises:
 determining that the drive mode of the vehicle is a two-wheel drive mode when the direction changing wheel of the vehicle is not the driving wheel; and
 determining that the power steering assembly is in a first power assisted gear position according to the two-wheel drive mode of the vehicle.

5. The power steering method according to claim 1, wherein determining the power assisted gear position of the power steering assembly according to whether the direction changing wheel of the vehicle is the driving wheel comprises:
 determining that the drive mode of the vehicle is a first all-wheel drive mode when the direction changing wheel of the vehicle is the driving wheel and the direction changing wheel is in an unlocked differential state; and
 determining that the power steering assembly is in a second power assisted gear position according to the first all-wheel drive mode of the vehicle, wherein a power steering torque generated by the second power assisted gear position is higher than a power steering torque generated by a first power assisted gear position.

6. The power steering method according to claim 1, wherein determining that the power steering assembly is in the target power assisted gear position according to the second all-wheel drive mode of the vehicle comprises:
 determining that the power steering assembly is in a third power assisted gear position according to the second all-wheel drive mode of the vehicle, wherein a power steering torque generated by the third power assisted gear position is higher than a power steering torque generated by a second power assisted gear position.

7. The power steering method according to claim 1, wherein the power steering method further comprises:
 displaying at least one of a drive mode of the vehicle and the power assisted gear position of the power steering assembly on a display assembly of the vehicle, wherein the drive mode of the vehicle is determined according to whether the direction changing wheel of the vehicle is the driving wheel.

8. The power steering method according to claim 1, wherein the power steering method further comprises:
 sending third information to a terminal, wherein the third information is used to indicate at least one of a drive mode of the vehicle and the power assisted gear position of the power steering assembly, wherein at least one of the drive mode of the vehicle and the power assisted gear position of the power steering assembly is displayed on the terminal, and wherein the drive mode of the vehicle is determined according to whether the direction changing wheel of the vehicle is the driving wheel.

9. A power steering device, applied to a vehicle comprising a power steering assembly, the power steering device comprising:
 a controller configured to
 detect whether a direction changing wheel of the vehicle is a driving wheel, wherein the direction changing wheel of the vehicle is a front wheel or a rear wheel of the vehicle;
 determine a power assisted gear position of the power steering assembly according to whether the direction changing wheel of the vehicle is the driving wheel; and
 control the power steering assembly to generate a power steering torque according to the power assisted gear position of the power steering assembly;
 wherein the controller is specifically configured to:
 determine that a drive mode of the vehicle is a second all-wheel drive mode when the direction changing wheel of the vehicle is the driving wheel and the direction changing wheel is in a locked differential state; and
 determine that the power steering assembly is in a target power assisted gear position according to the second all-wheel drive mode of the vehicle.

10. The power steering device according to claim 9, wherein the power steering device further comprises a first communication component or an input component;
 wherein the first communication component is configured to receive first information sent by a terminal, and the first information is used to determine the power assisted gear position corresponding to each of one or more drive modes; and
 wherein the input component is configured to obtain a first setting operation of a first setting control of the vehicle, and the first setting operation is used to set a power assisted gear position corresponding to each of one or more drive modes;
 and
 wherein the controller is specifically configured to
 determine a drive mode of the vehicle according to whether the direction changing wheel of the vehicle is the driving wheel; and
 determine the power assisted gear position of the power steering assembly according to the drive mode of the vehicle and the power assisted gear position corresponding to each of the one or more drive modes.

11. The power steering device according to claim 10, wherein the power steering device further comprises a first communication component or an input component;
 wherein the first communication component is configured to receive second information sent by a terminal, and the second information is used to determine a power assisted sub-gear position of the power steering assembly; and
 wherein the input component is configured to obtain a second setting operation of a second setting control of the vehicle, and the second setting operation is used to set a power assisted sub-gear position of the power steering assembly; and
 wherein the controller is further configured to control the power steering assembly to generate a power steering torque according to the power assisted gear position and the power assisted sub-gear position of the power steering assembly.

12. The power steering device according to claim 9, wherein the controller is specifically configured to determine that the drive mode of the vehicle is a two-wheel drive mode when the direction changing wheel of the vehicle is not the driving wheel; and determine that the power steering assembly is in a first power assisted gear position according to the two-wheel drive mode of the vehicle.

13. The power steering device according to claim 9, wherein the controller is specifically configured to determine that the drive mode of the vehicle is a first all-wheel drive mode when the direction changing wheel of the vehicle is the driving wheel and the direction changing wheel is in an unlocked differential state; and determine that the power steering assembly is in a second power assisted gear position according to the first all-wheel drive mode of the vehicle, wherein a power steering torque generated by the second power assisted gear position is higher than a power steering torque generated by a first power assisted gear position.

14. The power steering device according to claim 9, wherein the controller is specifically configured to determine that the power steering assembly is in a third power assisted gear position according to the second all-wheel drive mode of the vehicle, wherein a power steering torque generated by the third power assisted gear position is higher than a power steering torque generated by a second power assisted gear position.

15. The power steering device according to claim 9, wherein the power steering device further comprises a display component; and wherein the controller is further configured to control the display component to display at least one of a drive mode of the vehicle and the power assisted gear position of the power steering assembly, wherein the drive mode of the vehicle is determined according to whether the direction changing wheel of the vehicle is the driving wheel.

16. The power steering device according to claim 9, wherein the power steering device further comprises:

a second communication component configured to send third information to a terminal, wherein the third information is used to indicate at least one of a drive mode of the vehicle and the power assisted gear position of the power steering assembly, wherein at least one of the drive mode of the vehicle and the power assisted gear position of the power steering assembly is displayed on the terminal, and wherein the drive mode of the vehicle is determined according to whether the direction changing wheel of the vehicle is the driving wheel.

17. A vehicle, comprising a power steering device, wherein the power steering device is applied to the vehicle comprising a power steering assembly, and the power steering device comprises:

a controller configured to detect whether a direction changing wheel of the vehicle is a driving wheel, wherein the direction changing wheel of the vehicle is a front wheel or a rear wheel of the vehicle;

determine a power assisted gear position of the power steering assembly according to whether the direction changing wheel of the vehicle is the driving wheel; and control the power steering assembly to generate a power steering torque according to the power assisted gear position of the power steering assembly;

wherein the controller is specifically configured to:

determine that a drive mode of the vehicle is a second all-wheel drive mode when the direction changing wheel of the vehicle is the driving wheel and the direction changing wheel is in a locked differential state; and determine that the power steering assembly is in a target power assisted gear position according to the second all-wheel drive mode of the vehicle.

18. The vehicle according to claim 17, wherein the vehicle is an all-terrain vehicle.

19. The vehicle according to claim 17, wherein the power steering device further comprises a first communication component or an input component;

wherein the first communication component is configured to receive first information sent by a terminal, and the first information is used to determine the power assisted gear position corresponding to each of one or more drive modes; and wherein the input component is configured to obtain a first setting operation of a first setting control of the vehicle, and the first setting operation is used to set a power assisted gear position corresponding to each of one or more drive modes;

and wherein the controller is specifically configured to determine a drive mode of the vehicle according to whether the direction changing wheel of the vehicle is the driving wheel; and determine the power assisted gear position of the power steering assembly according to the drive mode of the vehicle and the power assisted gear position corresponding to each of the one or more drive modes.

20. The vehicle according to claim 17, wherein the power steering device further comprises a first communication component or an input component;

wherein the first communication component is configured to receive second information sent by a terminal, and the second information is used to determine a power assisted sub-gear position of the power steering assembly; and wherein the input component is configured to obtain a second setting operation of a second setting control of the vehicle, and the second setting operation is used to set a power assisted sub-gear position of the power steering assembly; and wherein the controller is further configured to control the power steering assembly to generate a power steering torque according to the power assisted gear position and the power assisted sub-gear position of the power steering assembly.

* * * * *